United States Patent [19]

Montague

[11] 4,294,223

[45] Oct. 13, 1981

[54] BI-LOOP HEAT RECOVERY SYSTEM FOR AN OIL FIRED FURNACE

[76] Inventor: Albert Montague, 1689 Blue Jay Lane, Cherry Hill, N.J. 08003

[21] Appl. No.: 72,086

[22] Filed: Sep. 4, 1979

Related U.S. Application Data

[63] Continuation-in-part of Ser. No. 7,412, Jan. 29, 1979, which is a continuation-in-part of Ser. No. 838,749, Oct. 3, 1977, abandoned.

[51] Int. Cl.$^3$ .......................... F24H 3/00; F23L 3/00; F24B 7/00
[52] U.S. Cl. .................................... 126/112; 126/293; 126/312; 165/DIG. 2; 237/55
[58] Field of Search .................. 126/112, 15 R, 15 A, 126/110 R, 290, 292, 293, 312; 237/55; 165/DIG. 2

[56] References Cited

U.S. PATENT DOCUMENTS

| | | | |
|---|---|---|---|
| 656,895 | 8/1900 | King | 126/293 |
| 762,913 | 6/1904 | Kitchen | 126/293 |
| 1,054,688 | 3/1913 | Harr | 126/312 |
| 1,671,147 | 5/1928 | De Mare | 126/112 |
| 1,752,663 | 4/1930 | Fagan | 126/15 R |
| 1,765,201 | 6/1930 | Borgeson | 126/112 |
| 2,361,643 | 10/1944 | Mueller | 237/55 |
| 2,441,286 | 5/1948 | Pound | 126/293 |
| 2,477,804 | 8/1949 | Huber | 126/112 |
| 2,818,060 | 12/1957 | Field | 126/307 |
| 2,962,218 | 11/1960 | Dibert | 237/55 |
| 3,292,682 | 12/1966 | Smith | 126/112 |
| 3,913,663 | 10/1975 | Gates | 165/DIG. 2 |
| 3,934,572 | 1/1976 | Teague | 126/92 B |
| 4,020,822 | 5/1977 | Harris | 126/112 |
| 4,038,963 | 8/1977 | Dingwall | 126/85 B |
| 4,050,628 | 9/1977 | Konnerth | 126/312 |
| 4,078,541 | 3/1978 | Roycraft | 126/112 |
| 4,149,671 | 4/1979 | Cagle | 126/112 |
| 4,161,941 | 7/1979 | Bloxham | 126/112 |

Primary Examiner—Daniel J. O'Connor
Attorney, Agent, or Firm—Hal J. Bohner

[57] ABSTRACT

A heating system for dwellings or other enclosures includes a furnace in which a burner is isolated from a hot air or water system, and receives substantially all of its combustion air from outside the enclosure and preheated. A heat exchanger is provided between exhaust gases from the burner of the furnace and the combustion air.

5 Claims, 6 Drawing Figures

BI-LOOP HEAT RECOVERY SYSTEM FOR AN OIL FIRED FURNACE

This application is a continuation-in-part of U.S. Patent Application Ser. No. 7,412, filed Jan. 29, 1979, which is a continuation-in-part of Application Ser. No. 838,749, filed Oct. 3, 1977 and now abandoned.

BACKGROUND OF THE INVENTION

1. Field of the Invention

This invention relates to a bi-loop heat recovery system for a conventional oil-fired heating system, and particularly to a heating system of the type suitable for heating a dwelling or other enclosure.

2. State of the Art

In conventional heating systems, air from the enclosure to be heated provides oxygen for combustion; and when the system is in operation, products of combustion together with any excess air are exhausted through a stack or other vent to the atmosphere. The air which is drawn into the furnace for combustion purposes and then discharges to the atmosphere must, of course, be replaced in the enclosure; and in conventional systems this takes place by the drawing of cold outside air through the most permeable portions of the structure of the enclosure, namely, gaps around window sashes, doors, down fireplace flues and the like. Even when such a system is not in operation, heated house air continues to be discharged through the stack because of buoyancy (differential temperature) and a venturi effect (suction) caused by wind across the stack which induces drafts into the enclosure. The passage of air often creates palpable drafts or cold spots. Moreover, since an entire building's heated (moist) air can be drawn through the furnace and exhausted to the atmosphere at rates ranging and at times exceeding 1-2 ft.$^3$/sec., considerable heat and moisture losses are characteristic of conventional systems of the above-described type. Furthermore, in an effort to save energy individuals are insulating their homes and closing off all drafts and air leaks. All fuel-burning appliances need air in order to burn the fuel properly. If a furnace is "starved" of its necessary intake air, it will operate inefficiently.

It has therefore been proposed that heat losses can be reduced in heating systems by supplying fresh air to the return air stream. For example, in U.S. Pat. No. 2,962,218, issued Nov. 29, 1960, to Dibert, it was suggested that a preheated stream of cool external air be used to equalize the air pressure within the enclosure with outside atmospheric pressure, for a resultant reduction in seepage of external air. Similarly, in U.S. Pat. No. 1,726,727, issued Sept. 3, 1929, to Wood, a furnace is proposed in which fresh air may be preheated and then mixed with a supply stream drawn from return air.

It should be understood that conventional heating systems can produce toxic carbon monoxide which represents a serious health risk. In particular, if the flue of a conventional furnace becomes blocked, the products of combustion, which can include carbon monoxide, can flow into the living space. Other malfunctions of a furnace can also result in carbon monoxide entering the living space. The severity of this and other furnace operating hazards has been recognized by the United States Consumer Product Safety Commission which found that between July, 1975, and July, 1976, an estimated 426 deaths were caused by carbon monoxide poisoning due to furnace malfunctions. In the past the only practical solution to this problem has been to insure that a furnace is properly operated and maintained.

SUMMARY AND OBJECTS

The present invention is directed to an oil-fired heating system for residences or other such buildings in which the problems of "induced" drafts and resulting heat losses and losses of cooled, conditioned air in the summer are reduced or eliminated by an arrangement in which substantially all of the air used by the heating unit for combustion purposes is drawn directly from outside the enclosure and preheated before combustion. In such a system the products of combustion are substantially free of heated (moist) air from the interior of the enclosure, thus reducing the tendency of the furnace to draw cold (dry) air into the heated interior of the enclosure, while providing the furnace with adequate air for combustion and at an intake air temperature that is significantly higher than existing outside ambient air levels.

It is another object of this invention to provide a furnace system in which the wiring inside the furnace is prevented from overheating. In particular, the present system provides admission of air which has not been preheated into the furnace.

Furthermore, retrofit of this bi-loop system on an existing furnace will not produce an adverse effect on the design and operating characteristics of the furnace established by the manufacturer. To the contrary, the bi-loop system enhances furnace efficiency and reduces or eliminates the need for an auxiliary humidification system.

Another unique feature of the bi-loop system is the maintenance of equal atmospheric pressure at points common to the burner and vent. That is, a common duct point supplies air to the burner and barometric draft regulator.

The foregoing and other objects of this invention are realized, in a presently preferred form of the invention, by a system in which a furnace is provided with a burner substantially isolated from the air in the enclosure, but supplying heat for the enclosure by indirect heat exchange. An exhaust duct is provided for conducting exhaust gases away from the burner and out of the enclosure. Supply and return conduits conduct the working fluid to be heated (which may be water, steam, or air) from the interior of the enclosure through the furnace. An air supply duct extends from outside the enclosure directly to the burner, and air in the duct is preheated by indirect heat exchange before entry into the burner. Openings are provided in the furnace to admit ambient air to prevent any overheating within the furnace.

FIGURES

For the purpose of illustrating the invention, there is shown in the drawings a form of the invention which is presently preferred—it being understood, however, that this invention is not limited to the precise arrangements and instrumentalities shown.

DETAILED DESCRIPTION OF THE PREFERRED EMBODIMENTS

Figure 1:
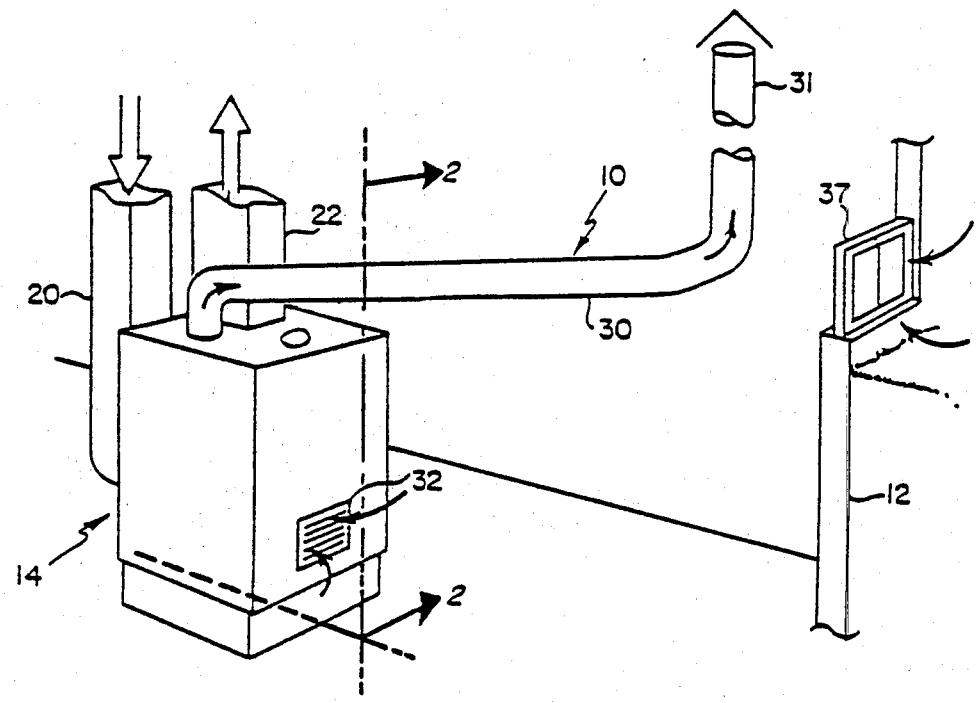
FIG. 1 is an illustration of a conventional oil-fired heating system.
Figure 2:
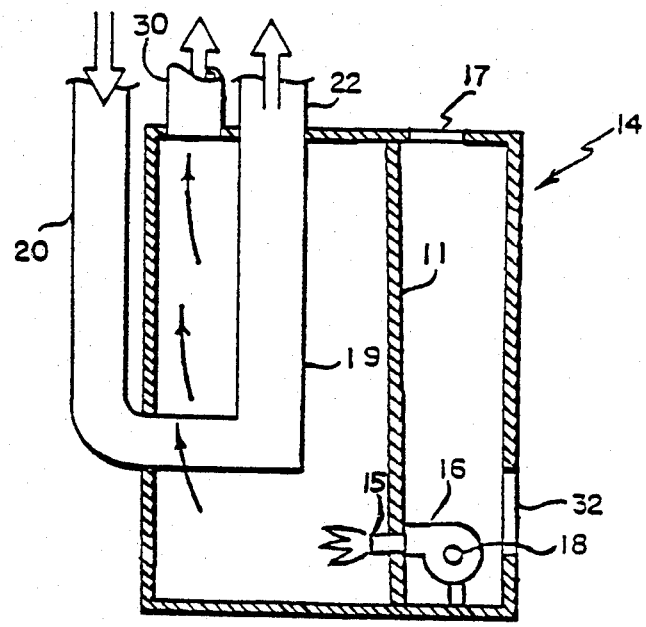
FIG. 2 is a cross-sectional view of a conventional furnace.

Referring now to the drawings in detail, wherein like numerals indicate like elements, there is seen in FIGS. 1 and 2 a conventional oil-fired heating system, designated generally by the reference numeral 10, the heating system being disposed within an enclosure 12. The enclosure 12 may be the basement of a building for residential or other use.

Disposed within the enclosure 12 and forming a part of the heating system 10 is a furnace designated generally by the reference numeral 14. The furnace 14 is conventional, and includes an oil burner nozzle 15, and oil pump and blower assembly 16. The oil pump and blower 16 pulls air from the interior of the furnace 14 through intake port 18 formed in the blower, and pumps oil from a source, not shown, and blows air and oil into the burner nozzle 15 for combustion. A wall 11 is located in the furnace 14 to form a heating zone containing the burner nozzle 15 and a second zone called a vestibule to contain the oil pump and blower assembly 16. Electrical wiring and electric circuits, not shown, are contained with the vestibule to the right of wall 11 to operate the blower assembly 16. A heating element 19 is represented as a conduit in a hot air system, but the principles of the present invention can also be applied to steam or hot water heating systems.

The furnace 14 has an air-intake pipe 20, and a return pipe 22, which are connected together by the heating element 19. The return pipe 22 has at its remote end (not shown) suitable outlets for heating the interior of the building.

The above-mentioned burner nozzle 15 applies heat to the air as the air passes through the heating element 19. Exhaust gases from the nozzle 15 leave the furnace 14 through an exhaust duct 30, and then flow to an exhaust stack 31 located on the roof of the building.

A combustion, draft and ventilation air inlet 32 is formed in the side of the furnace 14 to permit air from inside the enclosure 12 to enter the furnace to provide oxygen for combustion of fuel and draft air which rises with products of combustion. A barometric draft regulator is formed in the exhaust duct 30 to provide proper draft. A port 17 is formed in the upper end of the vestibule. Thus, air enters the vestibule through port 32, rises through the vestibule and exits via port 17 thereby preventing the wiring from overheating.

It should now be apparent that in the illustrated conventional form of the heating system, air traversing the heating element 19 can acquire heat by indirect heat exchange from the nozzle 15, and that the air thus heated is distributed through the return pipe 22 to desired parts of the building. Air for combustion, draft and ventilation on the other hand, enters the enclosure 12 via window 37 or other appropriate opening and flows into the furnace through inlet 32. The combustion products and draft air pass to the atmosphere through the exhaust duct 30 and the stack, while air leaves the vestibule through port 17.

Figure 3:
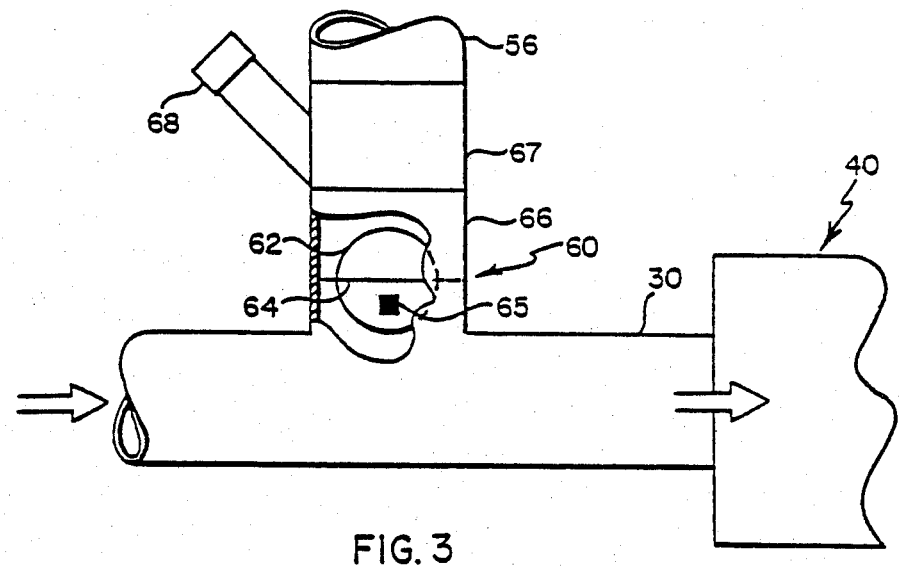
FIG. 3 illustrates a part of one embodiment of the present invention.
Figure 4:
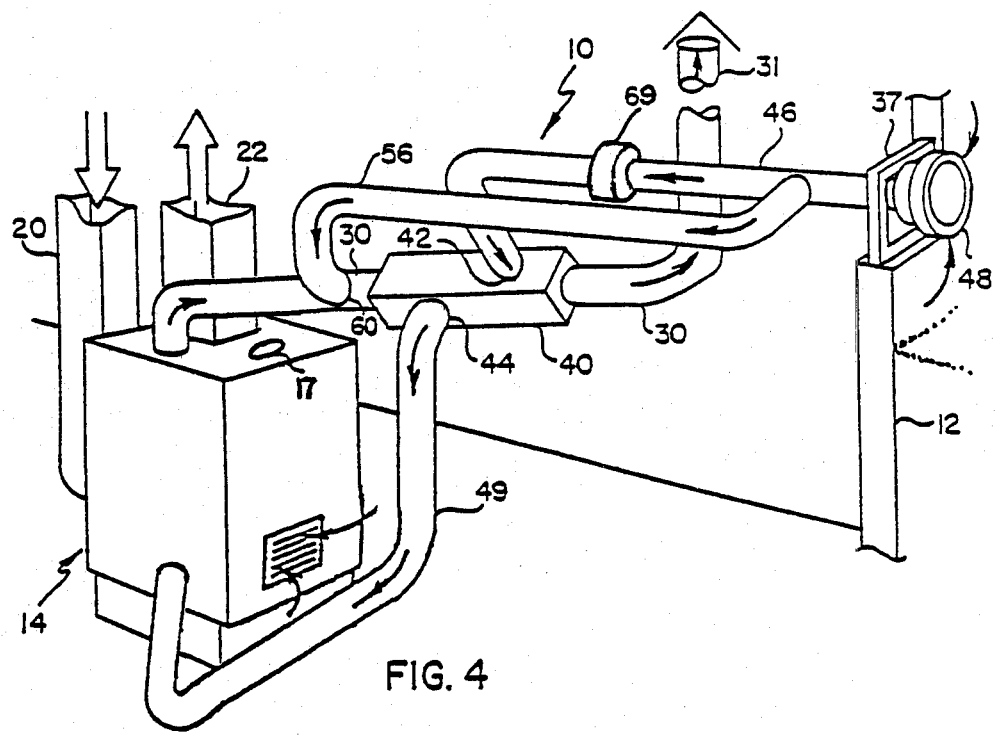
FIG. 4 illustrates one embodiment according to the present invention.

Turning now to FIGS. 3 and 4, there is illustrated a preferred form of the present invention installed in conjunction with the conventional heating system 10. A heat exchanger 40 is connected in heat flow communication with the exhaust duct 30, as will be discussed hereinafter. The illustrated heat exchanger 40 includes a rectangular conduit which encloses the exhaust duct 30, and inlet and outports 42 and 44, respectively, are formed in opposite ends of the heat exchanger. An inlet duct 46 is connected between the inlet port 42 and a specially designed vent cap 48 mounted in the window 37.

A duct 49 with flexible characteristics along part of its length and with a slip-fit joint is coupled to the outlet port 44 of the heat exchanger 40, and the duct 49 is in turn coupled to the inlet port 18 of the blower 16. The duct 49 passes through the wall of the furnace 14 and has its end coupled to the inlet port 18.

Turning now to FIG. 3, there is illustrated the barometric draft regulator 60, including a circular plate 62 pivotably mounted on a rod 64 to selectively open and close to permit desired flow through housing 66.

In accordance with the system shown in FIGS. 3 and 4 a conduit 56 is connected to the air inlet duct 46 near the vent cap 48. The conduit 56 is connected at its other end to a Y-shaped connector 67 which has a removable cap 68 connected to one leg. The third leg of the Y-shaped connector 67 is connected to the barometric draft regulator housing 66. In operation, when the furnace is functioning, circular plate 62 is maintained generally in a position to partially obstruct the flow of air through conduit 67. The orientation of the plate 62 is a function of furnace draft passing through conduit 30 and of the positioning of a counterweight 65. Therefore, installation of the Y-shaped connector 67 must provide for free and unimpeded movement of the circular plate 62. Adjustment of the draft regulator to obtain proper draft can be accomplished by removing the access hole cap 68, and adjusting the counterweight 65, then replacing the cap. It should be appreciated that hot gases rising through the stack 31 can induce excessive air to flow into the furnace. The draft regulator prevents this by admitting air into conduit 30 via conduit 56. The rate of flow through conduit 56 is controlled by the plate 62.

Optionally, a vent damper 69 installed in duct 46 downstream of the connection with duct 56 would be operated by a motor under the control of a temperature sensor located in exhaust duct 30 so that when the burner is not burning fuel, the vent damper will stop the flow of outside air through duct 46. In a furnace having water as a heat-conveying medium, this feature is advantageous because when the burner is off, cold air is not admitted to the furnace through conduit 46 and thereby the hot water in the furnace is not cooled by outside air.

In operation of the system illustrated in FIGS. 3 and 4, air for combustion enters through the specially designed vent cap 48 and flows through the heat exchanger 40 thereby acquiring heat. The heated combustion air thence flows through the duct 49, into the blower 16 and thence into the burner 15 for combustion therein. The rising products of combustion heat the air in the air intake pipe 19, and thereafter the products of combustion leave the furnace via exhaust duct 30. Ventilation air is admitted into the furnace via air inlet 32 and discharged through port 17.

One aspect of the present invention is conversion of the aforementioned conventional heating system to the present system whereby the conversion can be accomplished easily and with little alteration of the existing furnace system. Conversion of the existing conventional heating system shown in FIG. 1 to the presently preferred bi-loop system shown in FIGS. 3 and 4 can now be understood. Initially a length of the exhaust duct 30, having substantially the same length as the heat exchanger 40, is removed. Then the heat exchanger 40 is connected to the exhaust duct 30 in place of the removed section. Next, the specially designed vent cap 48 is installed in the window 37, and the inlet duct 46 is connected between the vent cap 48 and the inlet port 42. Then the duct 49 is coupled to the heat exchanger 40; a hole is cut in the side of the furnace; and the duct 49 is inserted through the hole. The duct 49 is then coupled to the inlet air port 18 of the blower 16. In practice, selected ducts forming the present system are crimped at their ends so that they can be fitted into other uncrimped ducts quickly and easily while providing an effective joint therebetween.

Figure 5:
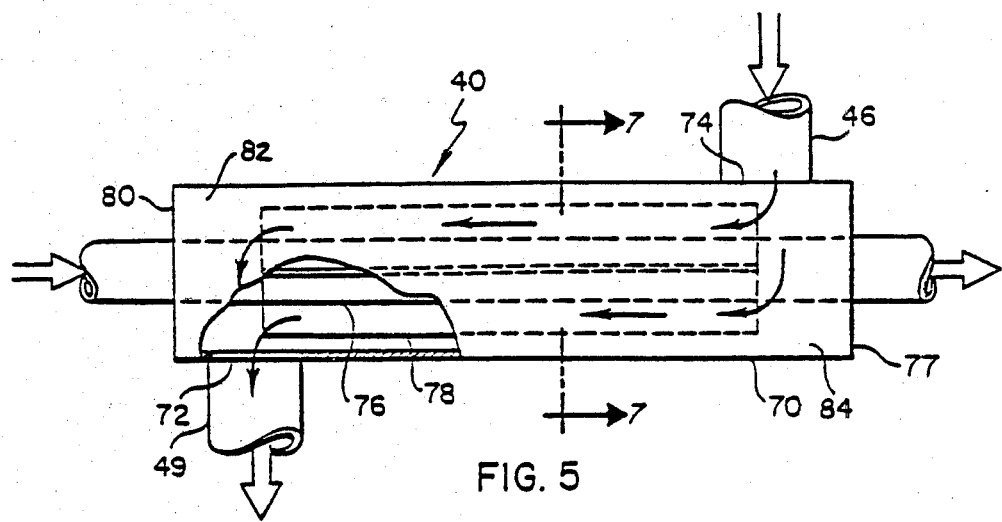
FIG. 5 illustrates one element of the system shown in FIG. 4.
Figure 6:
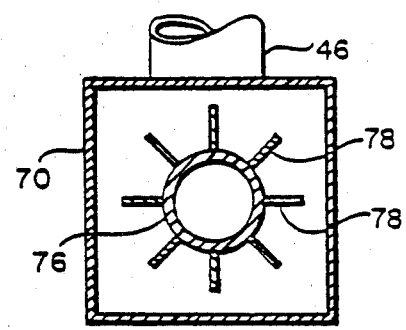
FIG. 6 illustrates a cross-sectional view of the device shown in FIG. 5.

Turning now to FIGS. 5 and 6 there is illustrated the preferred form of the heat exchanger 40. The illustrated heat exchanger 40 includes a substantially rectangular conduit 70 with an inlet port 74 formed in its upper right, and an outlet port 72 formed in its lower left end. The inlet and outlet ports can optionally be located 90° from one another, as well as 180° as in the illustrated configuration. A conduit 76, having a diameter substantially less than that of the conduit 70 extends through the conduit 70 parallel to the axis thereof. Two annular end caps 77 and 80 are affixed one to each end of the conduit 70 to cover the space between the conduits 70 and 76 and sealingly couple to the conduits. A plurality of radially-extending fins 78 are affixed within the conduit 70 to extend longitudinally for part of the length of the conduit 70 but spaced apart from the end caps 77 and 80 to provide for annular mixing chambers 82 and 84. The fins extend radially from the inner conduit 76 toward but separated from the outer conduit 70. The interior of conduit 76 can be considered a first zone of the heat exchanger, and the space between the conduits 76 and 70 a second zone. In operation, hot gas from the furnace flows through the inner conduit 76, i.e., the first zone, as illustrated by the arrows, thereby heating the fins 78. Cold air from the conduit 46 flows between the fins 78 in the second zone and acquired heat therefrom, and the heated air flows through conduit 49 and thence to the blower of the furnace.

It can now be understood that the system illustrated in FIGS. 3 and 4 includes two bi-loop features. In particular, one loop includes the stack 31, exhaust duct 30, furnace 14, duct 49, heat exchanger 40, and the inlet conduit 46. The second bi-loop feature includes conduit 56, duct 30, and stack 31.

It should be appreciated that this bi-loop configuration insures that equal atmospheric pressure is maintained at points common to the burner and the draft regulator 60. That is, air is supplied from a single source, vent cap 48.

Another important feature of the present bi-loop system can now be understood. According to conventional systems, such as illustrated in FIGS. 1 and 2, the burner receives combustion air from within the enclosure 12. Outside air is admitted into enclosure 12 via window 36. It is becoming increasingly popular to seal basements and the like to prevent entry of cold outside air, and thus openings such as window 37 are often blocked. This can result in inadequate oxygen for combustion being available to the burner, and carbon monoxide can be generated and enter the enclosure 12 through port 32.

The present bi-loop system, on the other hand, insures adequate oxygen is supplied to the burner so that carbon monoxide is not produced to accumulate in the enclosure 12. In particular, the system includes conduits 46 and 49 which convey air directly from the space outside the enclosure 12 to the furnace.

Additionally, it should be appreciated that the wiring inside the furnace vestibule is not allowed to overheat because air is admitted into the furnace via port 32 to flow through the vestibule and thence out through port 17.

I claim:

1. In a furnace located in an enclosure, the furnace having a burner, a blower coupled to the burner, an exhaust duct to convey products of combustion from the furnace to a stack, said exhaust duct having a barometric draft regulator, an improved system comprising:
    (a) heat exchange means which can be quickly and easily coupled to the exhaust duct to provide a first zone to carry the products of combustion, and a second zone in heat flow communication with the first zone to carry a stream of air;
    (b) first conduit means which can be quickly and easily coupled to provide gas flow communication between a point outside the enclosure and the second zone of said heat exchange means;
    (c) second conduit means which can be quickly and easily coupled to provide gas flow communication between said point outside the enclosure and the barometric draft regulator; and
    (d) third conduit means which can be quickly and easily coupled to provide gas flow communication between the second zone of said heat exchange means and the blower whereby air for combustion in the burner is supplied from said point outside the enclosure, and air is supplied to the barometric draft regulator from the same point outside the enclosure.

2. The system according to claim 1 wherein said first conduit means is disposed so that the point outside the enclosure is substantially spaced apart from the point where the stack terminates so that no substantial quantity of the products of combustion from the stack is aspirated into the air carried by said first conduit means.

3. The system according to claim 1 wherein the furnace includes an air inlet port to permit air to flow into the furnace.

4. The system according to claim 1 wherein said third conduit is coupled to said blower to provide substantially all of the air to said blower.

5. The system according to claim 1 further including a wall located in said furnace to form a heating zone and a vestibule, the blower being located in said vestibule, and the nozzle of said vestibule being located in said heating zone.

* * * * *